May 10, 1938.  J. R. GUILDFORD  2,116,626
COMPRESSION STOP AND DRAIN VALVE
Filed Nov. 16, 1936
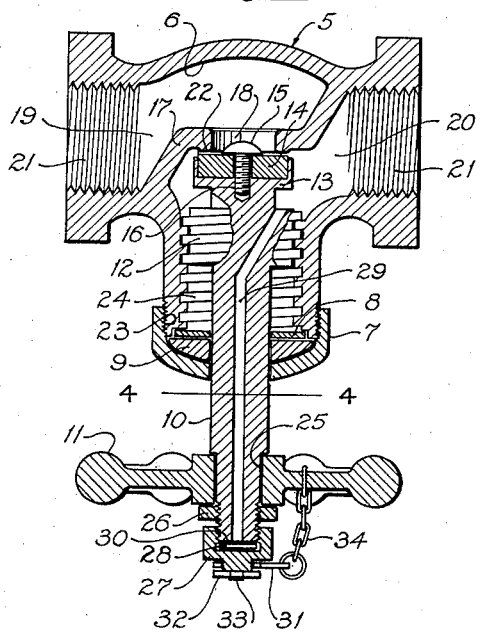
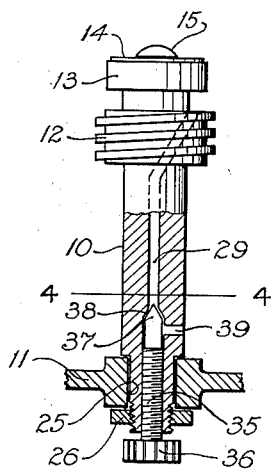
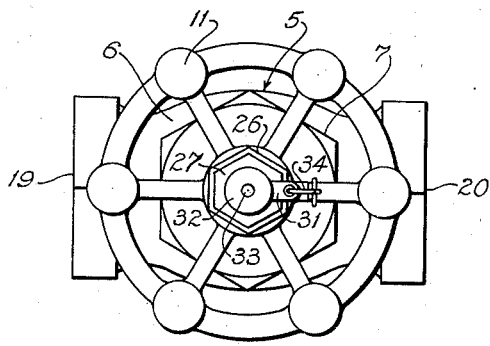
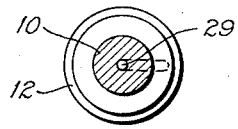
INVENTOR.
Joseph R. Guildford.

Patented May 10, 1938

2,116,626

UNITED STATES PATENT OFFICE 2,116,626

COMPRESSION STOP AND DRAIN VALVE

Joseph R. Guildford, Regina, Saskatchewan, Canada

Application November 16, 1936, Serial No. 111,019

11 Claims. (Cl. 251—20)

My invention relates to improvements in a compression stop and drain valve, and has for its primary object to provide, in a manner as hereinafter set forth, a stop and drain valve embodying a novel construction, combination and arrangement of parts through the medium of which, fluids beyond the valve may be drained from piping, equipment, plumbing systems and the like.

On the market at the present time there are compression stop and drain valves in which the drain or waste feature is incorporated in the side or bottom of the valve casing requiring a specially designed valve casing. In others the drain feature is incorporated in the side of the bonnet of the valve.

In my invention the drain feature is incorporated in the stem of the valve, and a most important object of the invention is that it will enable one to convert an ordinary compression stop valve into a compression stop and drain valve by merely changing the valve stem assembly.

Another object of the invention is to provide a compression stop and drain valve, simple in construction, reliable in use, compact and easily cleaned.

All of the foregoing and still further objects and advantages of the invention will become apparent from a study of the following specification, taken in conjunction with the accompanying drawing wherein like characters of reference designate corresponding parts throughout the several views, in which:—

Figure 1 is a view in vertical longitudinal section through the compression stop and drain valve through one embodiment.

Figure 2 is a bottom plan view of the compression stop and drain valve.

Figure 3 shows a valve stem assembly partly in vertical section incorporating a similar but slightly changed valved drain feature.

Figure 4 shows a section of the valve stem assemblies on lines 4—4 looking upward.

Referring to the drawing:—

The numeral 5 designates the compression stop and drain valve which comprises the casing 6, the cap nut 7 threadedly attached to the casing 6 at 23, a brass washer 8, a fabricated cone packing 9 through which operates the rotatable stem 10 carrying the handle 11. The valve stem is threaded as indicated at 12 for co-operation with a threaded bore 24 in the casing 6.

The upper end of the valve stem 10 is provided with an annular disk holder 13 in which a compressible annular disk 14 is retained and held in place near the vertical axis of the valve stem by a screw 15. A threaded bore is provided at 16 for the reception of the screw 15.

A web or partition 17 carried across the casing 6 of the valve 5 is provided with an opening 18 for the passage of fluids from the inlet 19 to the outlet 20 when the valve is open. Threads 21 are provided for attaching the valve to a pipe line.

The lower side of the web 17 around the opening 18 is provided with an annular raised seat 22 which is smoothly faced for the abutment of the compressible annular disk 14 when the valve is closed.

To prevent the handle 11 from rotating on the valve stem 10, a portion of the valve stem 10 is squared or milled at 25. A lock nut 26 is threadedly mounted on the valve stem to fasten the handle in place. A cap 27 is threadedly mounted on the lower end 30 of the valve stem 10 and provided with a compressible washer 28. A passage 29 is provided lengthwise through the valve stem 10 permitting communication between the outlet 20 and the atmosphere when the cap 27 and washer 28 is removed from the lower end 30 of the valve stem 10.

A swivel 31 is provided and held on to the cap 27 by means of a metal washer 32 riveted or otherwise fastened to the cap 27 at 33. A chain 34 is provided for attachment of the swivel 31 to the handle 11 thereby preventing the misplacement or loss of the cap 27, when the cap 27 is detached from the lower end 30 of the valve stem 10.

While the valve is in operation the cap 27 is screwed tightly onto the end 30 of the valve stem 10 compressing the washer 28 to make a water tight joint. The valve is opened by rotating the valve stem 10 drawing the compressible annular disk 14 away from the raised seat 22 permitting fluid to pass through the opening 18 into and beyond the outlet 20. If it is desired to drain the fluid from the outlet 20, the valve is closed and the cap 27 removed from the valve stem 10. The fluid to be drained will then pass through the passage 29 and be wasted to the atmosphere.

It will be obvious that if at any time foreign matter collects in the outlet 20 or passage 29 it may be quickly and easily cleaned by pushing a wire through the passage 29.

In Figure 3, closure means for the passage 29 consists of a screw 35 which is movably disposed within the valve stem 10. The lower end of the screw 35 is provided with an enlargement in the form of an annular milled flange 36.

The upper end of the screw 35 is provided with a conical point 37 for closely co-acting with the conical shaped portion 38 of the passage 29. The lower portion of the passage 29 for draining fluid from the outlet 20 is diverted through the side of the valve stem at 39.

When the passage 29 in Figure 3 is required for drainage the screw 35 is screwed outwardly from the valve stem 10 permitting fluid to pass through the conical portion 38 and through the diverted passage at 39 into the atmosphere. If the passage 29 should require cleaning of foreign matter, the screw 35 may be removed entirely and replaced when the passage 29 is clear.

Though I have shown and described herein a preferred embodiment of the invention, it is to be understood that I do not desire to limit the application of the invention thereto and any change or changes may be made in material, structure and arrangement of parts within the spirit of the invention and the scope of the subjoined claims.

What is claimed is:—

1. A compression stop and drain valve comprising a valve casing, a web carried across the casing and provided with an opening for the passage of fluids, an annular valve seat provided outwardly of and surrounding said opening, a movably disposed valve stem, a compressible annular member provided on one end of said valve stem, said compressible annular member forming closure means for said opening, a fluid inlet to said valve casing, a fluid outlet from said valve casing, said fluid inlet and outlet separated by said web and said compressible annular member when said opening is closed, a handle mounted on a portion of the valve stem, said handle being provided for rotatively moving said compressible annular member to and away from said valve seat, a continuous passage for draining a fluid directly from said fluid outlet to atmosphere beyond said handle, said passage extending longitudinally through said valve stem forming unbroken means of communication between said fluid outlet and said atmosphere, a cap provided with a compression washer mounted on the remaining end of said valve stem, said cap and washer forming closure means for said continuous passage.

2. A compression stop and drain valve comprising a valve casing, a web carried across the casing and provided with an opening for the passage of fluids, an annular valve seat provided outwardly of and surrounding said opening, a movably disposed valve stem, a compressible annular member provided on one end of said valve stem, said compressible annular member forming closure means for said opening, a fluid inlet to said valve casing, a fluid outlet from said valve casing, said fluid inlet and outlet separated by said web and said compressible annular member when said opening is closed, a handle mounted on a portion of the valve stem, said handle being provided for rotatively moving said compressible annular member to and away from said valve seat, a continuous passage for draining a fluid directly from said fluid outlet to atmosphere beyond said handle, said passage extending longitudinally through said valve stem forming unbroken means of communication between said fluid outlet and said atmosphere, a cap provided with a compression washer mounted on the remaining end of said valve stem, said cap and washer forming closure means for said continuous passage, flexible means being provided for attachment of said cap to said handle.

3. A compression stop and drain valve comprising a valve casing having a fluid inlet and a fluid outlet, a partition within said casing separating said fluid inlet from said fluid outlet, said partition being provided with an opening for the passage of fluids between said inlet and outlet, an annular valve seat provided outwardly of and surrounding said opening, an extension to said valve casing from said fluid outlet portion provided with a threaded bore, a valve stem member provided with a threaded portion for cooperation with said threaded bore, said valve stem member being provided at one end with an annular disk holder, a compressible annular disk mounted in said holder, means provided to retain said disk within said holder, a handle mounted on a portion of said valve stem member, said handle being provided for rotatively operating said threaded stem member portion within said threaded bore urging said annular disk toward or away from said valve seat to close or open respectively said opening for the passage of fluids, a continuous perforation for providing unbroken means of communication between said fluid outlet and the atmosphere, said continuous perforation extending through said valve stem member, a cap threadedly mounted on the remaining end of said valve stem member, said cap forming closure means for said perforation preventing communication between said fluid outlet and the atmosphere.

4. A compression stop and drain valve comprising a valve casing having a fluid inlet and a fluid outlet, a partition within said casing separating said fluid inlet from said fluid outlet, said partition being provided with an opening for the passage of fluids between said inlet and outlet, an annular valve seat provided outwardly of and surrounding said opening, an extension to said valve casing from said fluid outlet portion provided with a threaded bore, a valve stem member provided with a threaded portion for cooperation with said threaded bore, said valve stem member being provided at one end with an annular disk holder, a compressible annular disk mounted in said holder, means provided to retain said disk within said holder, a handle mounted on a portion of said valve stem member, said handle being provided for rotatively operating said threaded stem member portion within said threaded bore urging said annular disk toward or away from said valve seat to close or open respectively said opening for the passage of fluids, a continuous perforation for providing unbroken means of communication between said fluid outlet and the atmosphere, said continuous perforation extending through said valve stem member, a cap threadedly mounted on the remaining end of said valve stem member, said cap forming closure means for said perforation preventing communication between said fluid outlet and the atmosphere, means provided for attachment of said cap to said handle.

5. A compression stop and drain valve comprising a valve casing, a web carried across the casing and provided with an opening for the passage of fluids, an annular valve seat provided outwardly of and surrounding said opening, a movably disposed valve stem, a compressible annular member provided on one end of said valve stem, said compressible annular member forming closure means for said opening, a fluid inlet to said valve casing, a fluid outlet from said valve casing, said fluid inlet and outlet separated by said web and said compressible annular member when said opening is closed, a handle mounted on a portion of the valve stem, said handle being provided for rotatively moving said compressible annular member to and away from said valve seat, a continuous passage for draining a fluid directly from said outlet to atmosphere, a portion of said passage extending longitudinally through said valve stem and the remaining portion diverted through the side of said stem beyond said casing forming an unbroken means of communication between said outlet and said atmosphere, a conical valve seat provided within said longitudinal portion of the passage, a threaded bore provided in the remaining end of said valve stem in direct alignment with said longitudinal portion of the passage, a screw, said screw being threaded for cooperation with said threaded bore and provided on one end with an enlargement for rotatively operating said screw, the remaining end of said screw conically pointed for co-acting with said conical valve seat, said conical pointed screw and conical valve seat forming valve means for closing or opening said passage between said fluid outlet and the atmosphere.

6. A compression stop and drain valve comprising a valve casing having a fluid inlet and a fluid outlet, a partition within said casing separating said fluid inlet from said fluid outlet, said partition being provided with an opening for the passage of fluids between said inlet and outlet, an annular valve seat provided outwardly of and surrounding said opening, an extension to said valve casing from said fluid outlet portion provided with a threaded bore, a valve stem member provided with a threaded portion for co-operation with said threaded bore, said valve stem member being provided at one end with an annular disk holder, a compressible annular disk mounted in said holder, means provided to retain said disk within said holder, a handle mounted on a portion of said valve stem member, said handle being provided for rotatively operating said threaded stem member portion within said threaded bore urging said annular disk toward or away from said valve seat to close or open respectively said opening for the passage of fluids, a continuous perforation for providing unbroken means of communication between said fluid outlet and the atmosphere, a portion of said continuous perforation extending longitudinally through said valve stem member and the remaining portion diverted through the side of said member beyond said casing, a conical valve seat provided within said longitudinal portion of the perforation, a threaded bore provided in the remaining end of said valve stem member in direct alignment with said longitudinal portion of the perforation, a screw, said screw being threaded for co-operation with said threaded bore and provided on one end with an enlargement for rotatively operating said screw, the remaining end of said screw conically pointed for co-acting with said conical valve seat, said conical pointed screw and conical valve seat forming valve means for closing or opening said perforation between said fluid outlet and the atmosphere.

7. A valve stem providing a continuous unbroken conduit in combination with a valve casing, said casing having an inlet and outlet for passage of fluids through said valve casing, said valve stem having a portion provided with exterior threaded means to movably dispose said stem into and out of said valve casing, means being provided within said valve casing for co-action of said threaded means, valve means adapted for closing said passage of fluids between said inlet and outlet, said valve means being mounted on one end of said valve stem, a valve stem handle, said handle mounted on a portion of the remaining end of said stem, said remaining end of the stem extending beyond said valve casing, said handle being provided for rotatively operating said stem, conduit closure means, said valve stem conduit affording means for conveying a fluid from within said valve casing outlet direct to the atmosphere beyond said casing when said valve means is in closed position, said closure means threadedly mounted at the extended end portion of said stem providing means for sealing said fluid conveying means, said continuous unbroken conduit adapted for clearing of foreign matter throughout its entire length between said valve casing outlet and atmosphere.

8. A compression stop and drain valve comprising a valve casing having a fluid inlet and a fluid outlet, a partition within said casing separating said fluid inlet from said fluid outlet, said partition being provided with an opening for the passage of fluids between said inlet and outlet, an annular valve seat provided outwardly of and surrounding said opening, an extension to said valve casing from said fluid outlet portion provided with a threaded bore, a valve stem member provided with a threaded portion for co-operation with said threaded bore, said valve stem member being provided at one end with an annular disk holder, a compressible annular disk mounted in said holder, means provided to retain said disk within said holder, a handle mounted on a portion of said valve stem member, said handle being provided for rotatively operating said threaded stem member portion within said threaded bore urging said annular disk toward or away from said valve seat to close or open respectively said opening for the passage of fluids, a continuous perforation for providing unbroken means of communication between said fluid outlet and the atmosphere beyond said handle, said continuous perforation extending through said valve stem member, said perforation being adapted for clearing of foreign matter between said fluid outlet and the atmosphere, a cap threadedly mounted on the remaining end of said valve stem member, said cap forming closure means for said perforation preventing communication between said fluid outlet and the atmosphere.

9. A compression stop and drain valve comprising a valve casing having a fluid inlet and a fluid outlet, a partition within said casing separating said fluid inlet from said fluid outlet, said partition being provided with an opening for the passage of fluids between said inlet and outlet, an annular valve seat provided outwardly of and surrounding said opening, an extension to said valve casing from said fluid outlet portion provided with a threaded bore, a valve stem member provided with a threaded portion for co-operation with said threaded bore, said valve stem member being provided at one end with an annular disk holder, a compressible annular disk mounted in said holder, means provided to retain said disk within said holder, a handle mounted on a portion of said valve stem member, said handle being provided for rotatively operating said threaded stem member portion within said threaded bore urging said annular disk toward or away from said valve seat to close or open respectively said opening for the passage of fluids, a continuous perforation for providing unbroken means of communication between said fluid outlet and the atmosphere beyond said handle, said continuous perforation extending through said valve stem member, said perforation being adapted for clearing of foreign matter between said fluid outlet and the atmosphere, a cap threadedly mounted on the remaining end of said valve stem member, said cap forming closure means for said perforation preventing communication between said fluid outlet and the atmosphere, means provided for attachment of said cap to said handle.

10. A perforated valve stem with closure means adapted for converting a compression stop valve into a compression stop and drain valve, said perforated valve stem comprising a valve stem member having on one end an annular disk holder, a compressible annular disk mounted in said disk holder, a handle mounted at the opposite end of said valve stem, an enlargement provided concentrically on said stem near the said disk holder, said enlargement being threaded exteriorly, said valve stem having a continuous longitudinal perforation for providing unbroken means of communication for a fluid through and out of said stem, said perforation extending through said stem enlargement and continuing through said stem beyond said handle, perforation closure means, said closure means being provided for closing said fluid communication means through said longitudinally perforated stem, said compression stop valve comprising a casing having a fluid inlet and a fluid outlet for conveying a fluid through said casing, a partition web within said casing separating said inlet and outlet, said partition being provided with an opening for the passage of fluids between said inlet and outlet, an annular valve seat provided outwardly of and surrounding said opening, an extension to said valve casing from said fluid outlet portion, said extension being provided with a threaded bore, a conventional valve stem member provided with an exterior thread, said exterior thread adapted for co-operation with said threaded bore, said conventional stem being provided at one end with an annular disk holder and disk, a handle mounted on the opposite end of said conventional stem, said conversion being performed by removing said conventional valve stem from said casing and substituting said perforated valve stem with closure means, said exteriorly threaded concentric enlargement being adapted to co-operate with said threaded bore in said valve casing extension, said first named handle being provided for rotatively operating said threaded concentric enlargement within said threaded bore for urging said annular disk toward or away from said valve seat to close or open respectively said opening for the passage of fluids, said longitudinally perforated stem affording means for drainage of fluid from said fluid outlet beyond said valve casing extension.

11. A perforated valve stem with closure means adapted for converting a compression stop valve into a compression stop and drain valve, said perforated valve stem comprising a valve stem member having on one end an annular disk holder, a compressible annular disk mounted in said disk holder, a handle mounted at the opposite end of said valve stem, an enlargement provided concentrically on said stem near the said disk holder, said enlargement being threaded exteriorly, said valve stem having a continuous longitudinal perforation for providing unbroken means of communication for a fluid through and out of said stem, said perforation extending through said stem enlargement and continuing through said stem ahead of said handle, perforation closure means, said closure means being provided for closing said fluid communication means through said longitudinally perforated stem, said compression stop valve comprising a casing having a fluid inlet and a fluid outlet for conveying a fluid through said casing, a partition web within said casing separating said inlet and outlet, said partition being provided with an opening for the passage of fluids between said inlet and outlet, an annular valve seat provided outwardly of and surrounding said opening, an extension to said valve casing from said fluid outlet portion, said extension being provided with a threaded bore, a conventional valve stem member provided with an exterior thread, said exterior thread adapted for co-operation with said threaded bore, said conventional stem being provided at one end with an annular disk holder and disk, a handle mounted on the opposite end of said conventional stem, said conversion being performed by removing said conventional valve stem from said casing and substituting said perforated valve stem with closure means, said exteriorly threaded concentric enlargement being adapted to co-operate with said threaded bore in said valve casing extension, said first named handle being provided for rotatively operating said threaded concentric enlargement within said threaded bore for urging said annular disk toward or away from said valve seat to close or open respectively said opening for the passage of fluids, said longitudinally perforated stem affording means for drainage of fluid from said fluid outlet beyond said valve casing extension.

JOSEPH R. GUILDFORD.